United States Patent Office 3,315,013
Patented Apr. 18, 1967

3,315,013
GRAFT AND CROSS LINKED COPOLYMERS OF POLAR VINYLIDENE MONOMERS WITH ACRYLOXYPHENONES
Stanley Tocker, Wilmington, Del., assignor to E. I. du Pont de Nemours and Company, Wilmington, Del., a corporation of Delaware
No Drawing. Filed Sept. 28, 1962, Ser. No. 227,067
10 Claims. (Cl. 260—881)

This invention relates to the improvement of polymeric materials, particularly polymers of polar vinyl monomers which are more accurately called "polar vinylidene monomers."

This application is a continuation-in-part of my copending application Ser. No. 182,929 filed Mar. 27, 1962, now abandoned.

By "polar vinylidene monomers" are meant monomers having at least one polar group, e.g. an acetoxy group, an acetyl group, a cyano group, a halide group, a carboxamide group, a carboalkoxy group, etc. They are specifically covered by the formula $$CH_2=\underset{R^2}{\overset{R^1}{C}}$$

wherein $R^1$ is selected from one of the following groups:

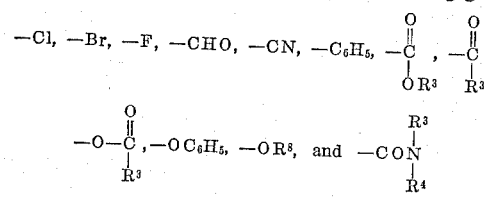

wherein $R^3$ and $R^4$ are each selected from the group consisting of alkyl and —H, $R^8$ is alkyl; and wherein $R^2$ is selected from the group consisting of $R^1$, —H and alkyl of 1–4 carbon atoms.

The most useful polar vinylidene monomers fall within the general formula $$CH_2=\underset{R^5}{\overset{R^1}{C}}$$

wherein $R^5$ is selected from the group consisting of —Cl, —Br, —F, —H and alkyl of 1–4 carbon atoms.

Specifically, the invention provides a relatively simple means for cross-linking polymers of polar vinylidene monomers and for grafting other monomeric materials to such polymers in order to obtain properties heretofore unobtainable in such polymers. For example, cross-linking when performed according to the present invention can be used to improve dimensional stability of shaped articles made from the polymers; to increase the resistance of the articles formed to permanent stress deformation; to reduce the permeability of such articles, e.g. films and the like, to grease or oil to increase the resistance of the polymeric articles to common organic solvents; and to increase the low temperature strength of such polymeric articles. Grafting, when performed according to the present invention, can be used to improve the physical properties mentioned above and, in addition, can be used to make normally intractable polymers tractable.

The means for cross-linking such polymers and for grafting other monomeric materials to such polymers comprises first copolymerizing the polar vinylidene monomer as defined above with 0.01–10 mole percent, preferably 0.1–10 mole percent, of a photosensitizing compound of the formula

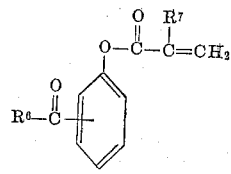

wherein $R^6$ is selected from the group consisting of methyl and phenyl and $R^7$ is selected from the group consisting of methyl and —H;

and, thereafter, exposing the copolymer, preferably after forming the copolymer into a shaped article, e.g. a film, filament, tube, rod, etc., to radiation having a wavelength of 2,000–7,000 Angstrom units, preferably 2,000–5,000 Angstrom units, for a time sufficient to insolubilize the copolymer in an organic solvent in which it is normally soluble without degrading the copolymer.

The lack of degradation is shown by no increase in infrared absorption in the 1650–1775 cm.$^{-1}$ region. Insolubilization is usually determined by noting the progressive precipitation of the copolymer in the solvent used during copolymerization as cross-linking of the copolymer progresses.

The grafting process is substantially the same as that given above for cross-linking except that the exposure to radiation is carried out in the presence of the "other monomeric material," which monomeric material has the formula

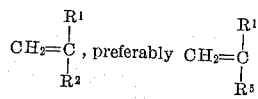

wherein $R^1$, $R^2$ and $R^5$ are as defined previously.

The preferred polar vinylident monomers for copolymerization and the preferred monomeric materials for grafting are vinyl acetate, vinyl chloride, methyl acrylate, acrylonitrile, vinylidene chloride and acrylamide. However, these monomers may be selected from quite a large group, as follows: vinylidene chloride, vinylidene fluoride, methyl, ethyl, isobutyl, butyl, octyl and 2-ethylhexyl acrylates and methacrylates; phenyl methacrylate, cyclohexyl methacrylate, p-cyclohexyphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, vinyl butyrate, acrolein, methacrolein, phenyl vinyl ether, methyl vinyl ether, isopropyl vinyl ether, n-butyl vinyl ether, isobutyl vinyl ether, ethyl vinyl ether, N-vinyl phthalimide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943.

The sensitizing monomer is characterized by having an acrylic ester group attached to a benzophenone or acetophenone radical. It is preferred that the acrylic ester group be attached to the benzophenone or acetophenone radical in the ortho- or 2-position. Thus, 2-acryloxyacetophenone, 2-acryloxybenzophenone, 2-methacryloxyacetophenone and 2-methacryloxybenzophenone are the preferred sensitizing monomers, their photosensitivity being about twice the photosensitivity of the corresponding para- or meta-substituted compounds. It should also be understood that other groups, e.g. alkyl, alkoxy, halogen, etc., may be substituted on the benzene rings of the benzophenone structure or the one benzene ring of the acetophenone structure. Such di-, tri-, etc. substituted compounds should be considered to be within the scope of the definition of the sensitizing monomers.

The process for preparing the copolymers involves subjecting the monomers, preferably in a solvent such as hexane, benzene, toluene, tetrachloroethylene, dimethylsulfoxide, etc., to a temperature of −40° to 300° C. and a pressure of 1–3000 atmospheres in the presence of a catalyst for a contact time sufficient to form the copolymer, usually at least 20 seconds for a continuous process and at least 3 minutes for a batch process, and then isolating the resulting copolymer.

When high pressures are used, 800 atmospheres and above, a conventional peroxide (di-tertiary butyl peroxide) or azo catalyst (alpha,alpha'-azobisdicyclohexanecarbonitrile) may be used and the temperature is preferably 25°–175° C.

It is believed that the essential feature of this type of catalyst, or more properly termed "initiator," is that it is capable of generating free radicals. These free radical initiators, whether they be generated from a peroxide compound or from an azo-type compound, combine with a polymerizable monomer to form a new free radical; the new free radical combines with another monomer molecule to form still another free radical; this process is repeated until there is propagated a long polymer chain. Polymer chain growth terminates when the free radical-bearing polymer fragment encounters another free radical which, for example, may be another growing polymer chain or an initiator free radical.

Typical peroxides which release free radicals to function as initiators include benzoyl peroxide, di-tertiary-butyl peroxide, tertiary-butyl peracetate, di-tertiary-butyl peroxydicarbonate, 2,2-bis(tertiarybutylperoxy)butane, dimethyl dioxide, diethyl dioxide, dipropyl dioxide, propyl ether dioxide and propyl methyl dioxide. Organic hydroperoxides are also applicable. For example, tertiary-butylhydroperoxide, cumene hydroperoxide, ethyl hydroperoxide, can be used to initiate polymerizations of this kind. Combinations such as ammonium persulfate with a reducing agent can also be used.

Typical azo compounds which decompose to liberate free radicals for initiation of polymerization include such catalysts as alpha,alpha'-azobisdicyclohexanecarbonitrile, alpha,alpha'-azobisisobutyronitrile, triphenylmethylazobenzene, 1,1'-azodicycloheptanecarbonitrile, alpha,alpha'-azobisisobutyramide, lithium azodisulfonates, magnesium azodisulfonate, dimethyl alpha,alpha'-azodiisobutyrate, alpha,alpha' - azobis,alpha,gamma-dimethylvaleronitrile) and alpha,alpha'-azobis(alpha,beta-dimethylbutyronitrile).

"Coordination" catalysts, as defined in U.S. Patent 2,822,357, may also be used to effect copolymerization. Specifically, such "coordination" catalysts are composed of:

(A) A compound containing at least one metal of the group consisting of metals of Groups IV$a$, V$a$ and VI$a$ of the Periodic Table, iron, cobalt, copper, nickel and manganese, said metal having directly attached thereto at least one substituent from the group consisting of halogen, oxygen, hydrocarbon and —O-hydrocarbon; and (B) A reducing compound selected from the group consisting of metal hydrides and compounds having a metal of Groups I, II and III of the Periodic Table, said metal being above hydrogen in the electromotive series, attached directly through a single bond to a carbon atom, said carbon atom selected from the group consisting of trigonal carbon and tetrahedral carbon.

In the above definitions, Periodic Table means Mendeléeff's Periodic Table of the Elements 25th ed., Handbook of Chemistry and Physics, published by the Chemical Rubber Publishing Co. Specific examples of compound (A) included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra(chloroethyl)zirconate, and the like. Specific examples of compound (B) in this definition are phenyl magnesium bromide, lithium aluminum tetraalkyl, aluminum trialkyl, dimethyl cadmium, diphenyl tin, and the like.

As stated previously, copolymerization is preferably carried out in a solvent medium. Among the solvents which have been found useful in the present invention are hydrocarbons and halogenated hydrocarbons: hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane may also be used. The preferred solvents are the nonpolar and aromatic solvents, e.g. benzene, hexane, cyclohexane, dioxane, etc. In some instances, copolymerization may be effected without a solvent or in an emulsion or slurry system.

The ratio of the photosensitizing monomer (the substituted benzophenone or acetophenone) to the polar vinylidene monomer should be such that the final copolymer is composed of at least .01 mole percent, preferably at least .1 mole percent, of the sensitizing monomer, the remainder being the other monomer or monomers. Less than .01 percent of the stabilizer does not provide sufficient sites for cross-linking or grating in the subsequent radiation step. A 10 mole percent seems to be an adequate maximum of sensitizing monomer in the copolymer. More than 10 mole percent does not provide sufficient improvement to warrant the use of the relatively expensive sensitizing monomer. It has been found that the reaction is very efficient so that a reaction mixture of about .01–10 mole percent of the sensitizing monomer and, correspondingly, about 99.99–90 mole percent of the remaining monomer or monomers usually will provide the desired polymer product for exposure to radiation.

The polymer product, in its preferred form prior to exposure to radiation, is a substantially linear polymer of the formula

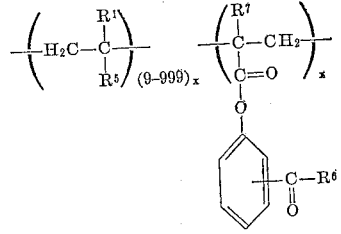

where $x$ is an integer.

In the following discussion, the method of cross-linking the resulting copolymer is discussed. However, it should be understood that the grafting procedure is identical except that the exposure of the copolymer to radiation occurs in the presence of a monomer and the grafting may require a slightly greater exposure. The amount of graftable monomer may be a very small amount to as high as 50 weight percent of the mixture or higher. Thus, in generic terms, the copolymer formed in the previous step may be subjected to radiation in the presence of from 0 to 50 weight percent of a graftable monomer and either cross-linking (when 0 weight percent of the monomer is present), grafting or both will occur.

Specifically, the composition in its basic form or, preferably, in the form of a shaped article, e.g. film, filament, pipe, rod, etc., is subjected to radiation having a wavelength of 2,000–7,000 Angstrom units. The manner of subjecting the material to radiation may involve exposure to high energy xenon radiation, to sunlamps or to ordinary sunlight. The period of exposure required will depend upon the method used. Thus, xenon radiation for a fraction of a second, sunlamps for a period of one second to about 30 minutes, depending on the distance between lamp and material to be irradiated, and sunlight for a period of 5 minutes to several hours all serve the purpose. The amount of exposure should be sufficient to crosslink the copolymer without degrading it.

Crosslinking is determined by noting the change in solubility of the composition. Thus, the acrylate and vinyl ester copolymers which are normally soluble in benzene at aobut 80° C. become insoluble after crosslinking. Similarly, the vinylidene chloride copolymers which are normally solube in tetrahydrofuran at about 60° C. or in orthodichlorobenzene at amout 130° C. become insoluble in these same solvents upon crosslinking. And acrylonitrile copolymers, soluble in dimethylformamide at about 60° C., become insoluble after crosslinking.

The maximum exposure to radiation is limited by the necessity to prevent degradation. Degradation is usually in the form of oxidative and chain cleavage of the composition and is accompanied by discoloration and a marked deterioration in the physical properties of the composition. Degradation is determined by infrared analysis in accordance with the following theory. It has been noted that photo-cross-linking is accompanied by a reduction in carbonyl absorption. This would indicate that cross-linking is produced by the reaction of the photo-excited aromatic groups of the units in the copolymer obtained from the photosensitive monomer. However, oxidation would lead to the formation of groups such as aldehyde groups, ketone groups, carboxyl groups, etc. These would be detected by an increase in infrared absorption in the 1650–1775 cm.$^{-1}$ region. By forming the copolymer first, as in the process of the present invention, the conditions for cross-linking can be sufficiently mild to substantially avoid any oxidative side reactions.

It should be understood that the compositions undergoing exposure to radiation, either in their basic form or in the form of shaped articles, may contain, besides the critical copolymer of the polar vinylidene monomer with the photosensitive monomer, dyes, fillers, pigments, plasticizers, slip agents, anti-static agents, etc. As long as the additives themselves are not adversely affected by radiation or do not adversely affect the composition being cross-linked, then it is intended that such compositions containing additives also be treated in accordance with the process of this invention.

It should also be understood that the copolymers can be used in blends with other polymers to form shaped articles, and the resulting blends can be exposed to radiation in order to cross-link the copolymers. Thus, a blend of a vinyl acetate/2-methacryloxybenzophenone copolymer with polyvinyl acetate can be treated in accordance with this invention. The blends should contain a sufficient amount of the copolymer so that the substituted benzophenone or acetophenone units represent at least 0.01 mole percent of the blend and preferably 0.1–10 mole percent of the blend. The blending process itself may be accomplished by any of the conventional methods. Thus, rubber milling, agitating in a liquid medium, etc., are all contemplated as possible blending methods.

It should be noted that the polymeric shaped articles such as the self-supporting films, filaments, etc., can be formed from the copolymers alone or in blends using standard procedures. These procedures may involve temperatures as high as 300° C. or higher. The presence of the thermally stable, bonded substituted benzophenone or acetophenone groups in the copolymer with the polar vinylidene monomer does not affect the thermal stability of the copolymer to any substantial degree. This represents an improvement over the use of peroxide or azo additives which are commonly used for heat-induced cross-linking. The use of peroxide or azo additives tends to cause premature cross-linking when processing occurs at high temperatures. This tends to restrict their use to high-flow resins and to resins where the molding temperature is below 175° C.

It should also be noted that the copolymers can be treated in accordance with the present invention in the form of large shaped articles. This results from the fact that very high energy radiation which involves radiation as a narrow beam is not necessary for cross-linking. Thus, the large articles can be cross-linked by merely exposing them to sunlight.

The resulting articles, after cross-linking or grafting, can be used wherever good physical properties and chemical properties are desirable. Thus, the self-supporting films are useful as containers for potato chips and bacon rinds where high oil and grease resistance is required. The films are also useful as protective sheeting in industrial construction and may also be used in photo-reproduction processes.

The invention will be more clearly understood by referring to the examples which follow. In the examples, values for inherent viscosity are presented. Inherent viscosity is directly related to the molecular weight of the polymer. It is defined by O. H. Cragg in J. Colloid Science, I pp. 261–269 (May 1946) as:

$$\text{Inherent viscosity} = \frac{\ln \text{ relative viscosity}}{C}$$

where relative viscosity is the ratio of the solution viscosity to the solvent viscosity, and C is the concentration of solute in solution measured as grams of polymer/100 milliliters of solution. In the examples, the inherent viscosity is measured as a 0.5 weight percent solution in a suitable solvent for the particular copolymer.

*Example 1*

To a dispersion of 20 grams (0.1 mole) 2-hydroxyacetophenone and 30 milliliters of water was added 6.5 grams (0.16 mole) sodium hydroxide. The mixture was stirred until a single phase resulted, and 16.8 grams (0.16 mole) of methacrylyl chloride was added dropwise with stirring. Stirring was continued for 0.5 hour and an oil phase resulted. The resultant oil phase was dissolved in ether and extracted with water.

After drying the solution over anhydrous sodium sulfate, ether was stripped, and the resulting oil was distilled. The product distilled at 110–112° C. at a pressure of 0.9 mm. of mercury. The yield was 18.1 grams and had a specific gravity at 25° C. of 1.5293. The chemical analysis was: carbon, 69.95%; hydrogen, 5.79% (calculated for $C_{12}H_{12}O_3$: carbon, 70.57%; hydrogen 5.92%). The product was 2-methacryloxyacetophenone.

A solution of 0.1 gram α,α′-azobisisobutyronitrile, 0.3 gram 2-methacryloxyacetophenone and 25 grams vinyl acetate in 25 milliliters of benzene was prepared. The solution was refluxed for 75 minutes with stirring under nitrogen. The resultant viscous solution was evaporated to dryness in a vacuum oven at 50° C. yielding 14.2 grams of the copolymer.

A clear 2 to 4 mil thick film was prepared by pressing a one-square inch sample at 100° C. under 20 tons pressure. Infrared analysis on the pressed film showed the presence of 0.9 mole percent methacrylic ester units in the polymer. The product had an inherent viscosity of 0.92 as measured in benzene at room temperature. This product was used as Control B.

As another control, Control C, vinyl acetate was polymerized in a solution in benzene in the presence of α,α′-azoisisobutyronitrile to yield 15.8 grams of polyvinyl acetate having an inherent viscosity of 0.95.

The copolymer and a portion of the polyvinyl acetate, both in the form of films, were exposed to a 1000 watt General Electric AH-6 lamp at a distance of three inches for one minute. The irradiated polyvinyl acetate film is Control A.

The solubilities of all the materials were tested in benzene at about 80° C. The results are presented in Table I.

TABLE I

| Example | Material | Solubility in Benzene at 80° C. |
|---|---|---|
| 1 | Irradiated Copolymer | Insoluble. |
| Control A | Irradiated Polyvinyl Acetate | Soluble. |
| Control B | Copolymer | Do. |
| Control C | Polyvinyl Acetate | Do. |

Example 2

To a dispersion of 20 grams (0.1 mole) p-hydroxybenzophenone and 50 milliliters of water was added 4.4 grams (0.11 mole) solution hydroxide. The mixture was stirred until a single phase resulted and 11.5 grams of methacrylyl chloride was added dropwise with stirring. Stirring was continued for 0.5 hour and an oil phase resulted. The oil phase was dissolved in ether and extracted with 1% (mole) aqueous sodium hydroxide in order to remove traces of the unreacted phenol.

After drying the solution over anhydrous sodium sulfate, ether was stripped and the resulting oil was dissolved in 50 milliliters of ethanol. Crystallization occurred after the mixture stood overnight at 10° C. The crude product was a white solid. Upon recrystallization from ethanol, 18.6 grams of white crystals were obtained. The melting point of the crystals was 63° C. The chemical analysis was: carbon, 75.86%; hydrogen, 5.01% (calculated for $C_{17}H_{14}O_3$: carbon, 76.67%; hydrogen, 5.34%). The product was 4-methacryloxybenzophenone.

A solution of 0.2 gram $\alpha,\alpha'$-azobisisobutyronitrile, 0.9 gram 4-methacryloxybenzophenone, 25 grams benzene and 23 grams vinyl acetate was prepared and was refluxed for 75 minutes with stirring under nitrogen. The resultant viscous solution was evaporated to dryness in a vacuum oven at 50° C. yielding 21 grams of polymer.

A clear 2 to 4 mil thick film was prepared by pressing a one-square inch sample at 100° C. under 20 tons pressure. Infrared analysis on the pressed film showed the presence of 1.5 mole percent methacrylic ester units in the polymer. The product had an inherent viscosity of 0.31 as measured in benzene at room temperature.

The results of solubility tests, after exposure of a sample of the copolymer to ultraviolet radiation as in Example 1, are presented in Table II.

TABLE II

| Example | Material | Solubility in Benzene at 80° C. |
|---|---|---|
| 2 | Irradiated Copolymer | Insoluble. |
| Control A | Copolymer | Soluble. |

Example 3

In a similar manner to that described in Example 2, p-hydroxybenzophenone and acrylyl chloride were reacted to give 4-acryloxybenzophenone. A solution of 0.2 gram $\alpha,\alpha'$-azobisisobutyronitrile, 0.9 gram 4-acryloxybenzophenone, 20 grams acrylonitrile and 25 milliliters of dimethylsulfoxide was refluxed for one hour with stirring under nitrogen.

The resulting viscous solution was evaporated on a glass plate to a clear film in a vacuum oven at 50° C., yielding 14.8 grams of polymer. Infrared analysis on the film showed the presence of 1.0 mole percent acrylic ester units in the polymer. The inherent viscosity was 0.92 as measured in dimethylformamide at about 60° C.

A control poly(acrylonitrile) film was similarly prepared, the preparation having yielded 15.8 grams of polymer having an inherent viscosity of 0.95.

The results of solubility tests, after exposure of a sample of the copolymer and a sample of the polyacrylonitrile to ultraviolet radiation as in Example 1, are presented in Table III.

TABLE III

| Example | Material | Solubility in Dimethylformamide at 60° C. |
|---|---|---|
| 3 | Irradiated Copolymer | Insoluble. |
| Control A | Irradiated Polyacrylonitrile | Soluble. |
| Control B | Copolymer | Do. |
| Control C | Polyacrylonitrile | Do. |

Example 4

A solution of 30 grams vinylidene chloride, 25 milliliters tetrahydrofuran, 0.2 gram $\alpha,\alpha'$-azobisisobutyronitrile and 0.9 gram 4-methacryloxybenzophenone (prepared as in Example 2) was refluxed for 1.5 hours with stirring under nitrogen. The resultant solution was evaporated to dryness in a vacuum oven at 50° C., yielding 24 grams of polymer.

A clear 2 to 4 mil thick film was prepared by pressing a one-square inch sample at 100° C. under 20 tons of pressure. Infrared analysis on the pressed film showed the presence of 1.5 mole percent of methacrylic ester units in the polymer. The product showed an inherent viscosity of 0.69 as measured in tetrahydrofuran at about 50° C.

A control poly(vinylidene chloride) polymerization was carried out similarly to yield 24 grams of polymer having an inherent viscosity of 1.06.

The results of solubility tests, after exposure of a sample of the copolymer and a sample of polyvinylidene chloride to ultraviolet radiation as in Example 1, are presented in Table IV.

TABLE IV

| Example | Material | Solubility in Tetrahydrofuran at 60° C. |
|---|---|---|
| 4 | Irradiated Copolymer | Insoluble. |
| Control A | Irradiated Polyvinylidene Chloride | Soluble. |
| Control B | Copolymer | Do. |
| Control C | Polyvinylidene Chloride | Do. |

Example 5

A solution of 24 grams methyl acrylate, 25 milliliters benzene, 0.2 gram $\alpha,\alpha'$-azobisisobutyronitrile, 0.9 gram 4-methacryloxybenzophenone (prepared as in Example 2) was refluxed for 20 hours with stirring under nitrogen. The result in solution was evaporated to dryness in a vacuum oven at 50° C. The yielded polymer was 18 grams.

A clear 2 to 4 mil thick film was prepared by pressing the one-square inch sample at 100° C. under 20 tons pressure. Infrared analysis on the pressed film showed the presence of 1.7 mole percent of methacrylic ester units in the polymer. The product showed an inherent viscosity of 0.09 as measured in benzene at 80° C.

A control poly(methacrylate) polymerization was carried out similarly to yield 20 grams of polymer having an inherent viscosity of 0.16.

The results of solubility tests, after exposure of a sample of the copolymer and a sample of the polymethacrylate to ultraviolet radiation as in Example 1, are presented in Table V.

TABLE V

| Example | Material | Solubility in Benzene at 80° C. |
|---|---|---|
| 5 | Irradiated Copolymer | Insoluble. |
| Control A | Irradiated Polymethacrylate | Soluble. |
| Control B | Copolymer | Do. |
| Control C | Polymethacrylate | Do. |

*Example 6*

A solution of 20 grams acrylonitrile, 25 milliliters of dimethylsulfoxide, 0.2 gram α,α'-azobisisobutyronitrile, 0.9 gram 4-methacryloxybenzophenone (prepared as in Example 2) was refluxed for 1.0 hour with stirring under nitrogen.

The resulting viscous solution was evaporated on a glass plate to a clear film in a vacuum oven at 50° C., yielding 16 grams of polymer having an inherent viscosity of 0.62 as measured in dimethylformamide at 60° C. Infrared analysis showed that the product contained 1.2 mole percent methacrylic ester units in the polymer.

The results of solubility tests, after exposure of a sample of the copolymer to ultraviolet radiation as in Example 1, are presented in Table VI.

TABLE VI

| Example | Material | Solubility in Dimethylformamide at 60° C. |
|---|---|---|
| 6 | Irradiated Copolymer | Insoluble. |
| Control A | Copolymer | Soluble. |

*Example 7*

The preparation of 2-methacryloxybenzophenone from 2-hydroxybenzophenone was carried out in a manner similar to that described in Example 2. Upon copolymerization with acrylonitrile according to the procedure in Example 6, 14.2 grams copolymer was obtained which had 0.8 mole percent methacrylic ester units and an inherent viscosity of 0.92 as measured in dimethylformamide at 60° C.

The results of solubility tests, after exposure of a sample of the copolymer to ultraviolet radiation as in Example 1, are presented in Table VII.

TABLE VII

| Example | Material | Solubility in Dimethylformamide at 60° C. |
|---|---|---|
| 7 | Irradiated Copolymer | Insoluble. |
| Control A | Copolymer | Soluble. |

*Examples 8–17*

In a manner similar to that described in Examples 1–7, 2-acryloxybenzophenone, 2-methacryloxybenzophenone, 2-methacryloxyacetophenone, 2-acryloxybenzophenone, 4-acryloxybenzophenone, 4-methacryloxybenzophenone, 4-methacryloxyacetophenone and 4-acryloxyacetophenone were prepared and copolymerized with a polar vinylidene monomer. The copolymers were prepared in the form of clear 2 to 4 mil thick films in a manner hereinbefore described. The films were exposed to a 1000 watt General Electric AH–6 lamp at a distance of 3 inches for periods of time up to 1 minute. All the copolymers prior to irradiation were soluble in their respective organic solvent at elevated temperatures. After exposure, the copolymers were completely insoluble in the same organic solvent, showing that they were cross-linked. Table VIII below lists the polar vinylidene monomer employed, the photosensitizing monomer copolymerized therewith, the percent (mole) photosensitizing comonomer in the final copolymer and the maximum exposure time required to cross-link (insolubilize) the copolymer.

TABLE VIII.—INSOLUBILIZATION OF COPOLYMERIC COMPOSITIONS
[Exposure conditions: General Electric 1000 watt AH–6 Lamp–3" from Sample]

| Ex. No. | Polar Vinylidene Comonomer Employed | Photosensitizing Comonomer Employed | Mole Percent Photosensitizing Comonomer in Copolymer | Maximum Exposure Time Required to Insolubilize Copolymer (seconds) |
|---|---|---|---|---|
| 8 | Vinylidene Chloride | 2-acryloxybenzophenone | 1.0 | 5 |
| 9 | do | 4-acryloxybenzophenone | 1.0 | 12 |
| 10 | Acrylonitrile | 2-methacryloxybenzophenone | 1.0 | 8 |
| 11 | do | 4-methacryloxybenzophenone | 1.0 | 20 |
| 12 | Vinyl Acetate | 2-methacryloxyacetophenone | 3.0 | 1 |
| 13 | do | 4-methacryloxyacetophenone | 3.0 | 1 |
| 14 | do | 2-methacryloxybenzophenone | 0.1 | 20 |
| 15 | do | 4-methacryloxybenzophenone | 0.1 | 45 |
| 16 | Methyl Acrylate | 2-acryloxyacetophenone | 1 | 13 |
| 17 | do | 4-acryloxyacetophenone | 1 | 21 |

Infrared analysis on the clear irradiated film samples of Examples 1–17 showed a reduction in the carbonyl absorption at approximately 1700 cm.$^{-1}$, further indicating that photocrosslinking of the copolymers had occurred. That no oxidative degradation had taken place was evidenced by the fact that no increase in infrared absorption in the 1650 to 1775 cm.$^{-1}$ region was noted.

*Examples 18–19*

These examples relate to the cross-linking of a methyl acrylate polymer and then grafting of acrylonitrile on the same polymer.

A methyl acrylate/4-acryloxybenzophenone copolymer (97/3 mole percent) was prepared in a manner similar to that described in Example 5. Three grams of the copolymer were dissolved in 15 milliliters of toluene, coated on a glass plate and dried. The resultant film was soluble in toluene. After exposure to a 1000 watt General Electric AH–6 lamp (3 inches from sample) for 1 to 2 seconds, the film was insoluble in toluene but readily swollen, indicating cross-linking.

Another copolymer film sample, prepared as above, was exposed to radiation under the same conditions as for cross-linking after the film had been coated with acrylonitrile. The exposure time was 30 minutes at room temperature. A weight gain of 28% (grafted acrylonitrile) was observed upon drying. No weight loss was observed when the film was washed with dimethyl sulfoxide, which would be a solvent for ungrafted acrylonitrile. The product was not swollen or dissolved by toluene.

*Example 20*

Twenty grams of vinyl acetate/4-methacryloxybenzophenone copolymer (96/4 mole ratio) was dissolved in 200 grams of toluene in a reaction vessel and heated to 60° C. To this solution was added 50 milliliters of n-hexane. No precipitation of the copolymer out of solution was observed.

A pool of the hot solution was doctored onto the surface of a piece of black paper (Crane & Co.—carbonizing grade) taped to a glass plate. A doctor blade with 8 mils clearance was utilized. The solvent was evaporated with a blast of hot air from a portable hot air dryer leaving an opaque coating on the film surface.

The paper was then exposed to a General Electric AH-6 ultraviolet lamp from a distance of 3 inches for 5 minutes. During exposure, a portion of the paper was covered by a circular aluminum disc and another portion, by a card-board label. After exposure, the paper was placed in a laboratory oven at 85° C. for 5 minutes. After heating, the unexposed shaped areas were completely coalesced and showed a shiny black surface. The surrounding exposed areas were completely unchanged in appearance (opacity).

This example illustrates the applicability of the copolymeric compositions in the preparation of photosensitive materials used for photocopying. Optical projection of an original onto the photosensitive paper through a positive or negative transparency, which is kept in intimate contact with the paper, will produce a latent image in the opaque coating. The irradiated portions will cross-link and therefore become fusible. Subsequent heat-treatment of the paper (e.g. passing over a heated roll) would develop a visible image by thermally clarifying the fusible portions of the coating and thereby allow the (dyed) surface of the paper to show through. The process would thus yield an exact reproduction of the original, i.e. a positive copy from a positive original, or a negative copy from a negative original. Since no additives are employed to render the materials photosensitive, this process has the advantage that no material can exude from the product.

Having fully disclosed the invention, what is claimed is:

1. A cross-linked copolymer of at least one polar vinylidene monomer having the formula

wherein $R^1$ is selected from one of the following groups:

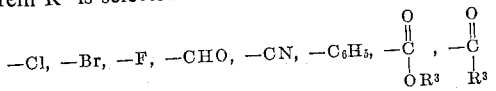

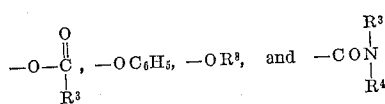

wherein
$R^3$ and $R^4$ are each selected from the group consisting of alkyl and —H, $R^8$ is alkyl;
and wherein
$R^2$ is selected from the group consisting of $R^1$, —H and alkyl of 1–4 carbon atoms;
and at least 0.01 mole percent of a monomer having the formula

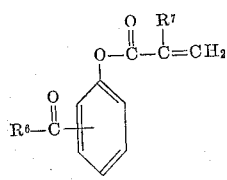

wherein
$R^6$ is selected from the group consisting of methyl and phenyl and
$R^7$ is selected from the group consisting of methyl and —H;

characterized by its insolubility in a solvent in which the copolymer, prior to cross-linking, was soluble.

2. A cross-linked copolymer of at least one polar vinylidene monomer having the formula

wherein $R^1$ is selected from one of the following groups:

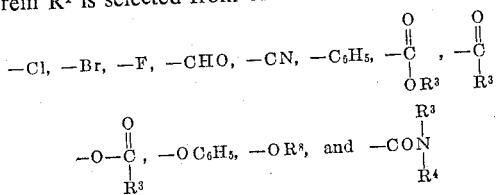

wherein
$R^3$ and $R^4$ are each selected from the group consisting of alkyl and —H, $R^8$ is alkyl;
and wherein
$R^5$ is selected from the group consisting of —Cl, —Br, —F, —H and alkyl of 1–4 carbon atoms;
and at least 0.1 mole percent of a copolymerizable monomer having the formula

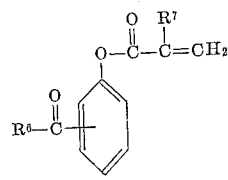

wherein
$R^6$ is selected from the group consisting of methyl and phenyl, and
$R^7$ is selected from the group consisting of methyl and —H;

characterized by its insolubility in a solvent in which the copolymer, prior to cross-linking, was soluble.

3. A cross-linked copolymer as in claim 2 wherein at least one polar vinylidene monomer is vinyl acetate and the solvent is benzene.

4. A cross-linked copolymer as in claim 2 wherein at least one polar vinylidene monomer is acrylonitrile and the solvent is dimethylformamide.

5. A cross-linked copolymer as in claim 2 wherein at least one polar vinylidene monomer is vinylidene chloride and the solvent is tetrahydrofuran.

6. A cross-linked copolymer as in claim 2 wherein at least one polar vinylidene monomer is methyl acrylate and the solvent is benzene.

7. A shaped article of a cross-linked copolymer of claim 2.

8. A film of a cross-linked copolymer of claim 2.

9. A copolymer of at least one polar vinylidene monomer having the formula

wherein $R^1$ is selected from one of the following groups:

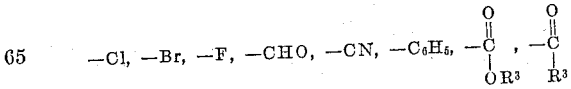

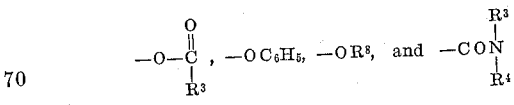

wherein
$R^3$ and $R^4$ are each selected from the group consisting of alkyl and —H, $R^8$ is alkyl;
and wherein $R^2$ is selected from the group consisting of $R^1$, —H and alkyl of 1–4 carbon atoms; and at least 0.01 mole percent of a monomer having the formula

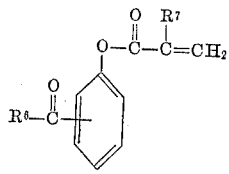

wherein
$R^6$ is selected from the group consisting of methyl and phenyl and
$R^7$ is selected from the group consisting of methyl and —H;
to which is grafted a monomer having the formula $$CH_2=\underset{R^2}{\overset{R^1}{C}}$$

10. A copolymer of at least one polar vinylidene monomer having the formula $$CH_2=\underset{R^5}{\overset{R^1}{C}}$$

wherein $R^1$ is selected from one of the following groups:
—Cl, —Br, —F, —CHO, —CN, —$C_6H_5$,

, , 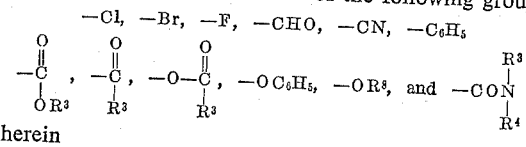

wherein
$R^3$ and $R^4$ are each selected from the group consisting of alkyl and —H, $R^8$ is alkyl; and wherein $R^5$ is selected from the group consisting of —Cl, —Br, —F, —H and alkyl of 1–4 carbon atoms; and at least 0.1 mole percent of a copolymerizable monomer having the formula

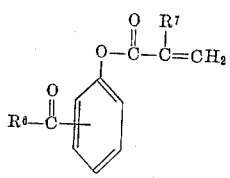

wherein
$R^6$ is selected from the group consisting of methyl and phenyl and
$R^7$ is selected from the group consisting of methyl and —H;
to which is grafted a monomer having the formula $$CH_2=\underset{R^5}{\overset{R^1}{C}}$$

References Cited by the Examiner
UNITED STATES PATENTS
2,837,496   6/1958   Vandenberg _____ 260—880
2,938,883   5/1960   Raich _____ 260—63

OTHER REFERENCES

Harwood et al.: "The Effects of Radiation on Materials," Rheinhold Publishing Co. (1958), pages 251, 252 and 269–275.

MURRAY TILLMAN, *Primary Examiner.*

M. FOELAK, *Assistant Examiner.*